United States Patent [19]

Fay

[11] Patent Number: 5,983,201
[45] Date of Patent: Nov. 9, 1999

[54] SYSTEM AND METHOD ENABLING SHOPPING FROM HOME FOR FITTED EYEGLASS FRAMES

[76] Inventor: Pierre N. Fay, 57 Kings Hwy. N., Westport, Conn. 06880

[21] Appl. No.: 08/874,269

[22] Filed: Jun. 13, 1997

Related U.S. Application Data

[60] Provisional application No. 60/041,748, Mar. 28, 1997.

[51] Int. Cl.[6] .................................................. G06F 17/60
[52] U.S. Cl. ............................................. 705/27; 705/26
[58] Field of Search ..................... 705/26, 27; 345/435; 351/246

[56] References Cited

U.S. PATENT DOCUMENTS

| | | | |
|---|---|---|---|
| 3,047,966 | 8/1962 | Greenspan . | |
| 3,729,839 | 5/1973 | Bourdier | 35/58 |
| 4,539,585 | 9/1985 | Spackova et al. | 358/93 |
| 4,730,260 | 3/1988 | Mori et al. | 364/518 |
| 4,845,636 | 7/1989 | Walker | 364/479 |
| 4,845,641 | 7/1989 | Ninomiya et al. | 364/518 |
| 4,852,184 | 7/1989 | Tamura et al. | 382/48 |
| 4,958,280 | 9/1990 | Pauly et al. | 364/403 |
| 4,991,005 | 2/1991 | Smith | 358/93 |
| 5,060,171 | 10/1991 | Steir et al. | 364/521 |
| 5,206,804 | 4/1993 | Thies et al. | 364/401 |
| 5,280,570 | 1/1994 | Jordan | 395/135 |
| 5,515,268 | 5/1996 | Yoda | 364/401 |
| 5,592,248 | 1/1997 | Norton et al. | 351/246 |
| 5,598,223 | 1/1997 | Leroux et al. | 348/589 |

*Primary Examiner*—Allen R. MacDonald
*Assistant Examiner*—Penny Caudle
*Attorney, Agent, or Firm*—Ware, Fressola, Van Der Sluys & Adolphson LLP

[57] ABSTRACT

A system and method for shopping, using a personal computer operated from a convenient location such as home, for fitted eyeglasses that can include either prescription or non-prescription lenses. A customer visits one of possibly several different customer diagnostic locations where digital images of the customer's head and face are acquired using various known techniques so as to obtain size and image data with respect to the customer. The customer then receives a password and information on how to connect to a computer (remote electronic store) associated with the various customer diagnostic locations. When the customer later connects a personal computer to the remote electronic store using the password issued by the customer diagnostic location, the remote electronic store provides images to the personal computer of how the customer would appear wearing different eyeglasses having frames fitted precisely to the customer's head based on the size and image data acquired at the customer diagnostic location. Alternatively the remote electronic store will download to the customer's personal computer an application that will construct the displays of how the customer would appear wearing different eyeglasses. The remote electronic store can further use frame selection data input by the customer related to the customer's lifestyle preferences. This information in combination with the size and image data is used by the remote electronic store to select a subset of frames best suited to the customer. The customer can purchase selected eyeglasses for direct delivery or for pick-up at a selected optical retail location.

25 Claims, 2 Drawing Sheets

5,983,201

SYSTEM AND METHOD ENABLING SHOPPING FROM HOME FOR FITTED EYEGLASS FRAMES

This Appln claims benefit of Provisional Appln No. 60/041,748 Mar. 28, 1997.

BACKGROUND OF THE INVENTION

1. Technical Field

The present invention pertains to the field of eyeglasses. More specifically, the present invention is concerned with fitting frames for eyeglasses to a customer and displaying to the customer, on a personal computer operated from a convenient location, such as the customer's home, how the customer would appear wearing the fitted eyeglass frames. The invention is further directed to obtaining information from the customer so as to help select a subset of eyeglass frames from the total set of frames available, and for displaying fitted images of eyeglass frames from the subset of frames to the customer.

2. Description of Related Art

As microcomputers have become increasingly powerful, more and more effort has been invested to enable offering products to a customer using a microcomputer to display the products. For selling products that a customer would wear, these efforts have resulted in systems in which a microcomputer adjusts the size of a product and, using a predetermined image of the customer, shows the customer how the customer would appear wearing the product. In particular, U.S. Pat. No. 5,280,570 to Jordan is directed to a system that shows a customer how the customer's eyes would appear to another person because of wearing eyeglasses with a certain prescription, causing the customer's eyes to appear larger or smaller, depending on the prescription, than without the lenses. This particular system includes elements that allow a customer to try on various eyeglasses, observe how the customer would appear wearing the eyeglasses, and place an order. The system uses lifestyle information obtained from the customer to limit what models of eyeglass frames it suggests to the customer. All of the elements of this system are physically collocated in a store where the customer must go in person to electronically try on the glasses and to place an order.

U.S. Pat. No. 5,515,268 to Youda discloses a system where a customer selects a product at a storefront location from a product list stored in a computer at a remote location. In this system a sensor detects customer size information and transmits it to the remote computer. The remote computer then selects a product of appropriate size and sends an image to the storefront for display on a monitor, showing the product superimposed on the customer. The product is fitted to the customer's body image using various computer transformations. Although the invention is not directed to a particular product, it teaches the use of an actuator in the form of a loop, which transfers product information to the customer. Such an actuator is of no use in fitting eyeglasses to a customer.

In U.S. Pat. No. 5,592,248 issued to Norton et al, a method is provided for fitting eyeglasses to a customer by taking pictures of the customer at one location and transmitting those pictures to a remote location where the pictures are examined in a way that allows an accurate determination of the shape and size of the customer's head so that eyeglass frames may later be custom manufactured. Norton, however, does not teach or suggest showing the customer how the customer would appear to others while wearing different pairs of eyeglass frames.

In all of this prior art, the customer places an order at a storefront after trying on glasses at the storefront. In the case of Youda, although the order is transmitted to a remote computer, the product is nevertheless ordered at a storefront and tried on at a storefront.

What is needed is a way of enabling a customer to try on eyeglass frames at home and order from home a pair of eyeglasses after having an opportunity to carefully consider many different eyeglass frames, in order to more likely meet the customer's needs. Trying on the eyeglasses at home (electronically) allows the customer to make a decision without any sense of urgency. For an investment in a product that can last at least several years, and that is crucial to the customer's daily comfort, providing a method that encourages the customer to take the time needed to arrive at a prudent decision benefits the customer and also the merchant, to the extent the customer is satisfied with the purchase. In addition, such a system could make custom fitting frames economically feasible where in some cases it is not; in such a system, the cost of supplying eyeglasses could be allocated more to manufacturing custom-fitted frames because of saving the cost of paying an attendant to wait on a customer. Furthermore, by making the selection process easier to the customer, the customer may be more likely to purchase new eyeglasses as compared to traditional selection techniques.

What is further needed is a method of assisting a customer in the selection process of eyeglass frames. The present invention, by its ability to electronically store information concerning eyeglass frames, is not limited with respect to the inventory of frames that can be maintained by the system; unlike a retail optician that must necessarily limit the potential choice in eyeglass frames.

What is still further needed is a method that can further assist the customer in eyeglass frame selection by questioning the customer, such as via a questionnaire, so as to obtain relevant information concerning the customer's lifestyle and customer's preference in eyewear. Such information can then be processed in conjunction with the customer's physical head and face measurements to select a subset of frames from the total set of frames maintained in the system's frame database.

What is also needed is such a system that provides a convenient method of ordering the desired eyeglass frame, including having delivery at home or order fulfillment at any one of a number of optical retail locations.

SUMMARY OF THE INVENTION

The present invention is a method of providing a customer an opportunity to examine on a personal computer (PC) how the customer would appear wearing different eyeglass frames fitted, electronically, to the customer. The customer can then order a pair of eyeglasses using the PC, which can be the customer's own PC, and which may be operated from the customer's home, or some other convenient location. The order fulfillment can be factory direct to the customer or via any one of a number of optical retail locations that can receive the order electronically. The eyeglass frames may house prescription lenses, or clear glasses, or sunglasses.

In one preferred embodiment the method requires that the customer visit any of a number of possible locations, called here customer diagnostic locations, set up to electronically ascertain information about the customer's head, face and skin color, sex etc. needed to size eyeglasses, and an image of the customer's head and face for showing how the customer would appear while wearing different eyeglass frames. Each of these different customer diagnostic locations is connected to a remote electronic store, having a database of information about different models of eyeglass frames, the information being sufficient to build an image of the eyeglass frame based on customer size information. The remote electronic store also includes means for creating an image of a particular customer wearing a particular fitted eyeglass frame. After a customer's size and image information is provided to the remote electronic store from a customer diagnostic location, the customer can go home and, using a personal computer, communicate with the remote electronic store to try on different eyeglass frames and possibly place an order.

It is an object of the present invention to enable a customer to examine from a convenient location, such as the customer's home, using a personal computer, how the customer would appear while wearing different eyeglass frames.

A further object of the present invention is to enable a customer to place an order for eyeglasses with the frames correctly sized for that particular customer.

It is a further object of the present invention to make it convenient for a customer to make available size and image information about the customer's head and face to enable shopping for frames using a personal computer from a convenient location, such as the customer's home.

A still further object of the present invention is to be able to assist the customer in selecting a subset of frames from the total set of frames available, the subset of frames best matched to the customer's physical characteristics and/or to the customer's lifestyle preferences, the latter of which may be obtained through questioning by the system of the customer's preferences, desires, interests and the like.

The above objects and others not specifically recited are realized in a specific illustrative embodiment of a system enabling a customer who has first provided to the system size and image information about the customer's head and face, to then use a personal computer to shop for fitted eyeglass frames from a convenient location instead of having to shop in person, the customer connecting the personal computer to the system using a password for identifying the customer to the system. The system comprises:

at least one customer diagnostic location for determining the size and image information and for providing the customer's size and image information along with the password; and a remote electronic store responsive to the size and image information, for providing the customer with fitted images showing how the customer would appear wearing different eyeglass frames fitted to the customer based on the customer size and image information, the fitted images provided through the personal computer operated by the customer from a convenient location;

so that the customer is able to view the fitted images provided by the remote electronic store in order to examine how the customer would appear wearing different eyeglass frames.

At the customer diagnostic center, the customer can also provide information to the system concerning the customer's lifestyle preferences. Such preferences can relate to general lifestyle interests and attitudes (e.g. whether the customer is trendy, conservative, athletic, etc.) as well as more specific customer preferences (e.g. desired color or style of eyewear, like/dislike in eyewear designs, etc.). Such lifestyle information can be obtained through various means; such as an interactive questionnaire, including expert systems methodology, answering information on an electronic form, multiple choice questions and the like.

In addition, such lifestyle information can be obtained on the customer's personal computer interacting with the remote electronic store. In fact, initial lifestyle information can be obtained at the customer diagnostic location and later refined/modified by the customer while the customer is using the system via the customer's personal computer.

Finally, in an alternative embodiment of the invention, the customer's size and image information can be obtained via the customer's personal computer when equipped with a digital camera and associated software for obtaining such information and transferring it to the remote electronic store.

In addition, the system can provide the customer with the ability to order any selected eyeglass frame with prescriptive lenses if desired. Such ordering can be fulfilled directly to the customer or to any one of a number of opticians stored in an optical retail database at the remote electronic store.

The above objects and others not specifically recited are also realized in a specific illustrative embodiment of a method for enabling a customer who has first provided size and image information about the customer's head and face, to then use a personal computer to shop for fitted eyeglass frames from a convenient location instead of having to shop in person, the customer connecting the personal computer to the system using a password for identifying the customer to the system. The method comprises the steps of:

determining at a first location the size and image information and providing the customer's size and image information along with the password to a second location; and using at the second location the size and image information to determine fitted images showing how the customer would appear wearing different eyeglass frames fitted to the customer, and providing the fitted images to the customer through the personal computer operated by the customer;

so that the customer is able to view the fitted images provided by the remote electronic store to examine how the customer would appear wearing different eyeglass frames.

The additional features of the above-recited system can also be realized in this method.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
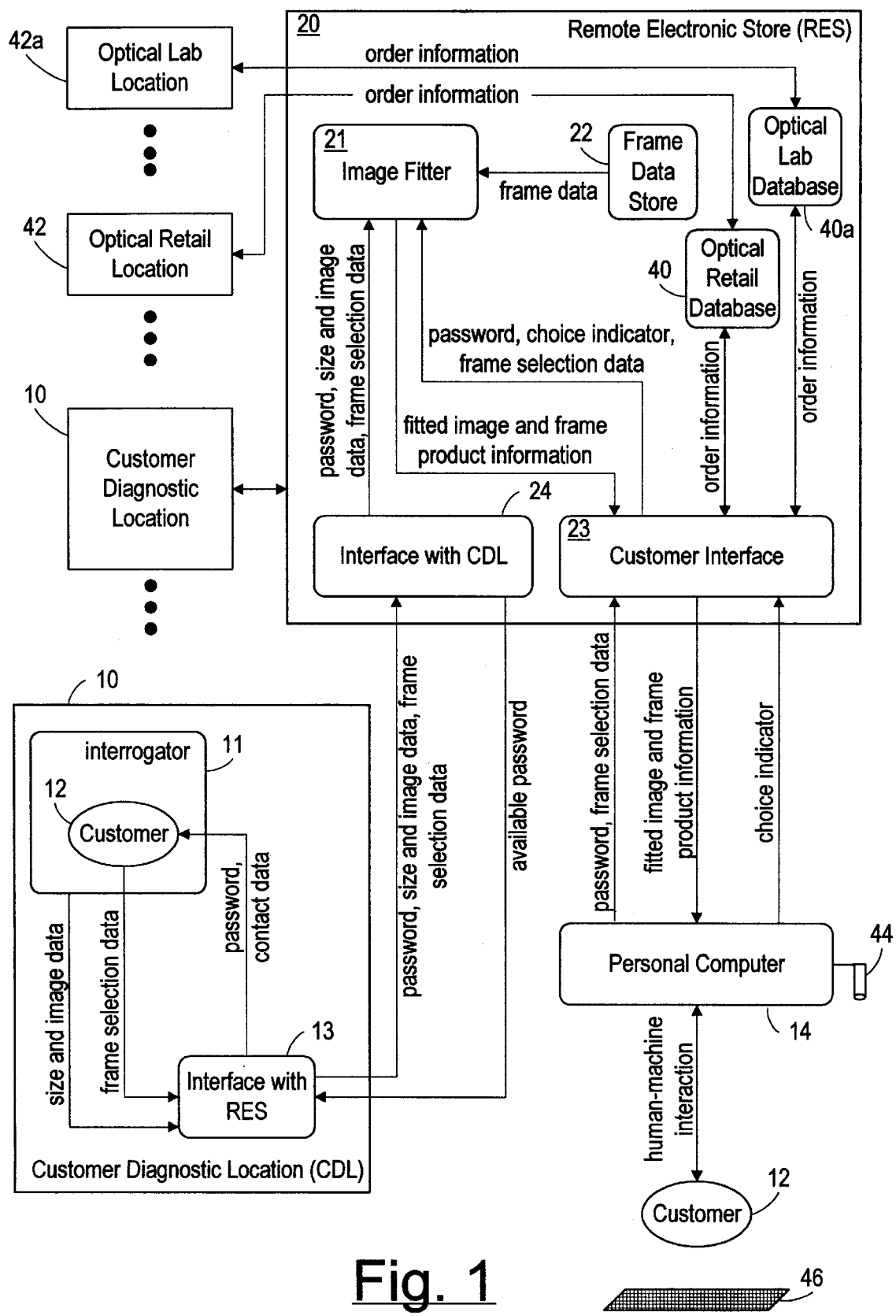
FIG. 1 is a block diagram showing the elements of a system for home purchase of fitted eyeglass frames according to the present invention.

Referring now to FIG. 1, a system enabling a customer to shop for a pair of fitted eyeglass frames from home or some other convenient location includes one or more customer diagnostic locations 10, each including an interrogator 11 for determining customer size and image information, i.e. one or more pictures of the customer's head and face, and an interface 13 to a remote electronic store (RES) 20. Color information about the customer's face preferably forms part of the customer image information. Customer identity information (contact data) is also obtained via interrogator 11 and interfaces with interface 13.

After a customer 12 cooperates with the interrogator 11, the customer receives a password and other information needed by the customer to later communicate electronically, using a personal computer, with the remote electronic store 20. The interrogator 11 may include one or more digital cameras, or one or more digital cameras equipped with distance measuring equipment or providing stereoscopic images, in order to provide all of the data the remote electronic store needs to precisely fit a pair of eyeglass frames to the customer. A single digital camera with a scaling reference 46 (see FIG. 1) juxtaposed with the customer's head can also be used to obtain pertinent customer size information. In particular, for example, this data includes the distance between the pupils of the customer's eyes, head width, bridge measurement, shape of face characteristics (such as roundish, high cheek bones, squarish, etc).

A customer diagnostic location 10 may be an unmanned booth including all of the hardware and software needed to accomplish the two tasks of determining the customer information and communicating with the remote electronic store. A customer diagnostic location 10 may be located in any appropriate location, including on the premises of an optician or an optometrist.

In the preferred embodiment, the remote electronic store 20 provides through a customer diagnostic location interface 24 an available password for the customer diagnostic location to issue to a customer, although many other schemes are possible for ensuring that different customer diagnostic locations do not issue the same password. The customer diagnostic location interface 24 receives from a customer diagnostic location 10 a customer's size and image data along with the password assigned to the customer and any frame selection data acquired from the customer for use in limiting what frames the remote electronic store may later suggest to the customer. This frame selection data might include, for example, characteristics of the customer's lifestyle to help select out frames generally, or specific characteristics of the desired eyeglass frames, such as that the frames be lightweight or metal or plastic or particularly sturdy. Other lifestyle information can form part of the frame selection data. Such information can include the customer's activity level, the customer's desired lifestyle (e.g. trendy, conservative, etc.) and various fashion related interests. This information is obtained by interrogator 11 via questioning, filling in electronic forms, or other methodologies, e.g. expert system questioning.

After leaving the customer diagnostic location 10, a customer 12 uses a personal computer 14 to connect to a customer interface 23 at the remote electronic store 20, providing a password to identify the customer to the store so the store can retrieve the customer's size, image information, and frame selection data, if present. The remote electronic store 20 includes an image fitter 21 for creating a fitted image, i.e. an image of a particular customer wearing a particular eyeglass frame where the frame has been fitted to the customer based on the customer size and image information. The store also includes a frame data store 22, which includes all of the information that the store needs to build an image of any frame fitted to any particular customer, and also includes frame product information, such as information about the weight of the frames, or the material the frames are made from.

The customer interface 23 transmits an image of a customer wearing a particular eyeglass frame, and accepts from the customer inputs, or choice indicators, indicating whether the customer would like to try on a different pair of eyeglasses, order a pair of eyeglasses already tried on, change any frame selection data, or discontinue shopping. If the customer wants to try on another pair, the customer interface 23 will display images of the eyeglass frames for sale. The particular eyeglass frames displayed in this situation might be limited based on the frame selection data provided by the customer to the remote electronic store, either through a customer diagnostic location 10 as already explained or through the customer interface 23 of the remote electronic store.

The frame selection data can be used by the remote electronic store to select a subset of frames from the total set of frames available in the RES frame data store (frame database). The customer can further refine/modify this subset of frames by providing further frame selection data to the RES via the choice indicator. Thus the customer via the customer's personal computer can interact with the RES in a way that provides convenient, relaxed and unhurried viewing of any desired eyeglass frame. Since the frame data store is electronic, its size is realistically unlimited and therefore virtually any frame model of any manufacturer can be included. As compared to traditional opticians, the universe or set of potential frames is dramatically enhanced for the customer's benefit. Furthermore, this database can be readily updated to accurately reflect changes and additions to this universe of available frames.

If the customer desires to purchase an eyeglass frame, an order form is presented to the customer's personal computer for entry of relevant purchase information. The customer can select delivery of the frames to the customer's location or direct that the frames be obtained via a selected optical retail store. In the latter situation, the RES includes an optical retail database 40 for storage of optical retail location information which can be presented to the customer. Once the order is complete, the relevant order information concerning the frame style, size, color, prescriptive lens information (if required), and customer information is sent to the selected optical retail location 42 for processing of the order. The customer can then complete the transaction at the selected optical retail location. The optical retail location would of course have a pre-arranged agreement with the proprietor of the system with respect to fees and the like. If the customer instead wishes to order the frames and have them delivered, the customer order is placed in an optical lab database 40a, so that the order information is accessible to an optical lab location 42a.

The customer's personal computer 14 can include a digital camera 44, which can obtain the customer's size and image data similar to that obtainable at the customer diagnostic center. The camera can be used in conjunction with a scaling device 46, which can provide sufficient depth information about the customer's head that 3-D digital cameras are not necessary to obtain the size and image data.

In the preferred embodiment of the present invention, the remote electronic store 20 is accessed by a customer from a home personal computer over the Internet.

Figures 2, 2A:
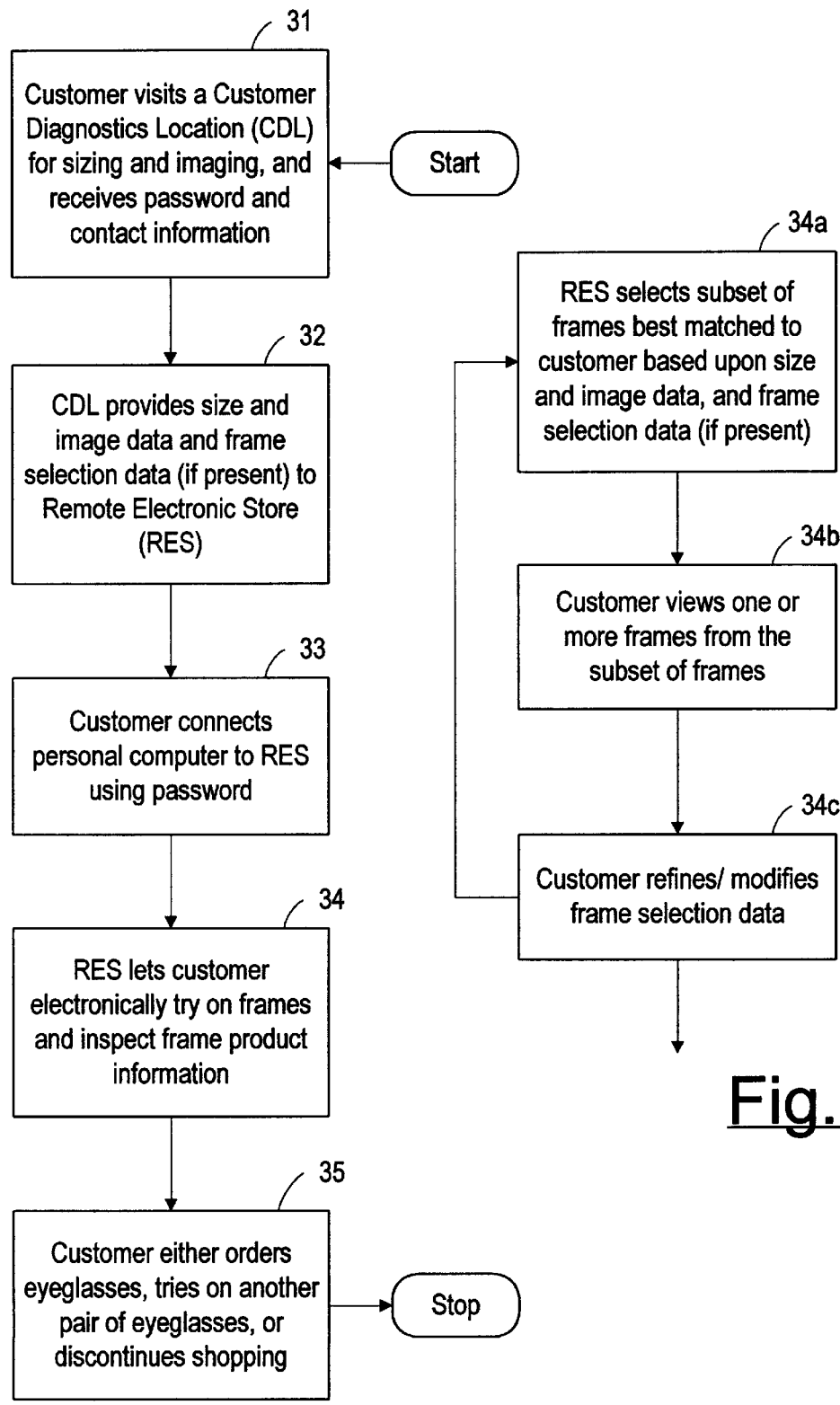
FIG. 2 is a flow chart showing the steps according to the present invention for ordering from home fitted eyeglass frames.
FIG. 2a is an expanded flow chart of the eyeglass frame and fitting process step shown in FIG. 2.

Referring now to FIG. 2, according to the method of the present invention a customer can shop for fitted eyeglasses from a convenient location such as home by first visiting a customer diagnostic location where the customer cooperates with equipment for determining customer size and image information (step 31). Next the customer diagnostic location transmits the customer size and image information to a remote electronic store (step 32). Later, a customer uses a personal computer from home or some other location with the password issued by the customer diagnostic location to communicate with the remote electronic store (step 33). Then the remote electronic store lets the customer electronically try on (visualize) different eyeglass frames (step 34). Here the remote electronic store calculates an image of the face of the customer wearing a pair of eyeglass frames the customer has indicated, and transmits that fitted image to the customer's personal computer. The customer can then view that image, and decide to try on another pair of eyeglasses, order that particular pair of eyeglasses, or discontinue shopping (step 35).

In the usual practice of the present invention, the customer diagnostic location can include various combinations of equipment for capturing head and facial images, each combination sufficient to provide both the images of the customer's head and face and information needed by the remote electronic store to calibrate the images to actual distance. Although it is not necessary, in the usual practice of the present invention, the digital images are taken in color and the customer's skin tone is taken into account in suggesting to the customer what eyeglass frames the customer might like to try. This size and image information can also be obtained via a digital camera located at the customer's personal computer. Other image data, such as head shape, sex of the customer, and the like can be used to select a subset of frames that best match the particular customer.

In addition, the frame selection data input at the customer's diagnostic center (see FIG. 1) can be used in conjunction with the size and image data to select the most appropriate subset of frames best matched to the particular customer. Some or all of this information can be obtained from the customer via the customer's personal computer. The customer can also modify previously input frame selection data at the customer's personal computer. As best seen in FIG. 2a, in this manner an interactive method is presented that allows the customer to view selected frames, to potentially view other frames based upon interaction with the remote electronic store, and to ultimately order eyeglass frames for delivery to the customer or for pickup at a selected optician.

In some embodiments of the present invention, the customer will follow simple procedures using either a touch sensitive monitor or keyboard to interpret photographs taken with one or more digital cameras or digital three-dimensional cameras. A customer will identify for the system where in a photograph are located different facial features, including the customer's eyes, the longitudinal center of the customer's face, and certain coordinate points of the silhouette of the customer's face. A customer can also assist the system in defining the shape of the customer's face, skin tone and hair color. In other embodiments of the present invention, this photo interpretation is done automatically.

In another aspect of the present invention, a customer will leave a customer diagnostic location 10 not only with a password, but also with a disk including a password and a copy of a digital image of the customer's head and face, along with software that automates linking to the remote electronic store 20 from a personal computer at a location convenient for the customer.

In another aspect of the present invention, a customer need not visit a customer diagnostic location at all. If a customer has a digital camera, the customer can provide digital images from the customer's home PC and whatever additional information is needed by the remote electronic store to size the customer's photographic images. To provide that additional information, the customer either directly measures distances between different points on the customer's face, uses a three-dimensional digital camera, or provides other stereo information, such as provided by taking essentially simultaneous digital photographs using two cameras a known distance apart. A standard digital camera 44 can be used with the personal computer in conjunction with a scaling device 46 to obtain the necessary size and image data. In fact, all of the information that could be provided to the remote electronic store by having a customer visit a customer diagnostic location could also be provided by the customer through a personal computer using a digital camera or other sensor recording equipment. In this case, the customer receives a password directly from the remote electronic store.

In another aspect of the present invention, to speed up displaying images of the customer wearing different eyeglass frames, the remote electronic store 20 sends to the customer's personal computer an application that will create and display these images. Then the customer can disconnect from the remote electronic store and examine the different images without assistance from the remote electronic store. In this embodiment, the remote electronic store also downloads specifications about each eyeglass frame so that the customer can learn more about a frame of interest.

In another aspect of the present invention, a customer is able to manually move an eyeglass frame up and down on the customer's face to examine how the eyewear would appear in the customer's preferred style of wear. This manual movement can be input via a pointing device as part of the customer's personal computer. The customer, when placing an order for prescription eyeglasses, provides both the frame the customer would like and also a lens prescription. The present method also applies to shopping for sunglasses or other non-prescription glasses.

In another aspect of the present embodiment and in contrast to the preferred embodiment, each customer diagnostic location 10 includes a means for scaling a customer's image to one-to-one and provides that scaling information to the remote electronic store 20. In the preferred embodiment, this scaling is done by the remote electronic store 20.

At a customer diagnostic location 10, in the preferred embodiment of the present invention, five aspects of the customer's head are determined: the head shape, skin tone, hair color, head width and temple length. These characteristics are determined automatically by equipment at the customer diagnostic location with the customer's cooperation, and in some cases, a customer is asked to confirm a determination made by the equipment. For example, the equipment at the location will determine automatically the basic shape of the customer's face from among seven basic shapes: oval, diamond, round, square, triangle, inverted triangle, and oblong. An application at the customer diagnostic location displays, on a computer screen, photographs of the customer's face with each different basic shape superimposed. The application indicates the shape it determines is best fitting, but the customer is prompted either to agree or to choose a different basic shape.

It is to be understood that the above-described arrangements are only illustrative of the application of the principles of the present invention. In particular, the remote electronic store may be accessed using either the Internet or any other communication line, and the customer may connect to the remote electronic store using a personal computer from any location that happens to be convenient for the customer, not only the customer's home. Furthermore, although the system and method of the present invention are shown with respect to selection of eyeglass frames, the system and method can also be used to view, select and purchase other head related products, such as jewelry, cosmetics and hair products. Numerous other modifications and alternative arrangements may be devised by those skilled in the art without departing from the spirit and scope of the present invention, and the appended claims are intended to cover such modifications and arrangements.

What is claimed is:

1. A system enabling a customer who has first provided to the system size and image information about the customer's head and face, to then use a personal computer to shop for fitted eyeglass frames from a convenient location instead of having to shop in person, the customer connecting a remote personal computer to the system, the system comprising:

A) at least one customer diagnostic location for determining the size and image information using a digital camera for providing photographs of the customer and a means for scaling distances in the photographs to actual distances, and for providing the customer size and image information along with customer identifying information, wherein the image information includes a characterization of the customer's face as a basic shape selected from a predetermined group of basic shapes; and B) a remote electronic store having means for receipt of provided customer size and image information and customer identifying information and responsive to said information for providing the customer with fitted images showing how the customer would appear actually wearing different eyeglass frames fitted to the customer based on the customer size and image information, the fitted images provided through the personal computer operated by the customer from a convenient location; whereby the customer is able to view the fitted images provided by the remote electronic store to examine how the customer would appear wearing different eyeglass frames.

2. A system for shopping for fitted eyeglass frames as claimed in claim 1, wherein the remote electronic store includes means for using the customer size and image information for determining which eyeglass frames to provide fitted images thereon.

3. A system for shopping for fitted eyeglass frames as claimed in claim 1, wherein the customer diagnostic location further comprises:

1) an interrogator for examining the customer's head and face to provide customer size and image information; and 2) an interface with the remote electronic store for providing the customer with a password representing the customer identifying information, and for providing to the remote electronic store the customer's size and image information along with the customer's password.

4. A system for shopping for fitted eyeglass frames as claimed in claim 3, wherein the interrogator determines how the size and image data relates to an absolute scale of distance.

5. A system for shopping for fitted eyeglass frames as claimed in claim 4, wherein the remote electronic store further comprises:

1) an image fitter for providing said fitted images to the customer;

2) an interface with the customer diagnostic location responsive to the password and to the size and image data provided by the customer diagnostic location, for providing the password and the size and image data to the image fitter;

3) a frame data store for providing frame data; wherein the image fitter is responsive to the password and the size and image data provided by the interface with the customer diagnostic location, and is further responsive to the frame data, for providing a fitted image to the customer; and 4) a customer interface responsive to the password and also to choice indicators, both the password and choice indicators communicated by the customer using a personal computer, the customer interface further responsive to the fitted images provided by the image fitter, the customer interface for providing the password and the choice indicators to the image fitter, and further for providing the fitted images to the customer through the personal computer operated by the customer.

6. A system for shopping for fitted eyeglass frames as claimed in claim 5, wherein the image fitter has means for providing frame product information based upon information in the frame data store and further wherein the customer interface is responsive to the frame product information so as to provide said information to the customer through the personal computer operated by the customer.

7. A system for shopping for fitted eyeglass frames as claimed in claim 6, wherein the customer diagnostic location has means for interrogating and receiving frame selection data from the customer and for providing the frame selection data to the remote electronic store; and wherein the remote electronic store image fitter is responsive to said frame selection data and suggests to the customer eyeglass frames in accord with the frame selection data, wherein the frame selection data specifies structural material and style characteristics of eyeglass frames.

8. A system for shopping for fitted eyeglass frames as claimed in claim 7, wherein the frame selection data may be modified by the personal computer operated by the customer.

9. A system for shopping for fitted eyeglass frames as claimed in claim 8, wherein the remote electronic store further comprises:

5) an optical retail database containing information with respect to opticians that can provide a selected eyeglass frame to the customer;

wherein the image fitter via the customer interface can receive choice indicator information from the user concerning a selected eyeglass frame; and 6) means for transferring the selected eyeglass frame and customer data to a selected optician;

whereby the customer can select the optician that the customer desires to provide the selected eyeglass frame.

10. A system for shopping for fitted eyeglass frames as claimed in claim 1, wherein the customer diagnostic location has means for interrogating and receiving frame selection data from the customer, and wherein said frame selection data is provided to the remote electronic store; and further wherein the remote electronic store has means responsive to said frame selection data and suggests to the customer eyeglass frames in accord with the frame selection data, wherein the frame selection data specifies structural material and style characteristics of eyeglass frames.

11. A system for shopping for fitted eyeglass frames as claimed in claim 10, wherein the frame selection data may be modified by the personal computer operated by the customer.

12. A system for shopping for fitted eyeglass frames as claimed in claim 11, wherein the remote electronic store further comprises:
1) an optical retail database containing information with respect to opticians that can provide a selected eyeglass frame to the customer;
2) means for receipt of choice indicator information from the user concerning a selected eyeglass frame; and
3) means for transferring the selected eyeglass frame and customer identifying information to a selected optician; whereby the customer can select the optician that the customer desires to provide the selected eyeglass frame.

13. A system for shopping for fitted eyeglass frames as claimed in claim 1, wherein the remote electronic store further comprises:
1) an optical retail database containing information with respect to opticians that can provide a selected eyeglass frame to the customer;
wherein the remote electronic store can receive choice indicator information from the user concerning a selected eyeglass frame; and
2) means for transferring the selected eyeglass frame and customer data to a selected optician;
whereby the customer can select the optician that the customer desires to provide the select eyeglass frame.

14. A system for shopping for fitted eyeglass frames as claimed in claim 1, wherein the remote electronic store downloads to the personal computer operated by the customer a means for creating fitted images of how the customer would appear wearing different eyeglass frames, the means using the customer's size and image data along with different frame data to create the fitted images.

15. A system for shopping for fitted eyeglass frames as claimed in claim 1, wherein the customer diagnostic location further comprises means for receipt of customer data useful in determining what eyeglass frames to suggest to the customer, and wherein the remote electronic store comprises a frame data store containing data about each frame offered for sale and means for selecting a subset of said frames based at least in part on the customer data, wherein customer data useful in determining what eyeglass frames to suggest includes structural material and style characteristics of eyeglass frames.

16. A system enabling a customer to use a personal computer to shop for fitted eyeglass frames, the system comprising:
A) a personal computer at a first location having means for determining size and image information about the customer's head and face using a digital camera for providing photographs of the customer and a means for scaling distances in the photographs to actual distances, for receipt of customer identifying information, and for providing the customer size and image information along with customer identifying information to a second location remote from the first location, wherein the image information includes a characterization of the customer's face as a basic shape selected from a predetermined group of basic shaves; and
B) a remote electronic store at the second location having means for receipt of provided customer size and image information and customer identifying information and responsive to said information for providing the customer with fitted images showing how the customer would appear actually wearing different eyeglass frames fitted to the customer based on the customer size and image information, the fitted images provided through the personal computer operated by the customer from a convenient location;
whereby the customer is able to view the fitted images provided by the remote electronic store to examine how the customer would appear wearing different eyeglass frames.

17. A system as claimed in claim 16 wherein the personal computer has means for receiving frame selection data from the customer and providing said frame selection data to the remote electronic store; and wherein the remote electronic store has means responsive to said frame selection data and suggests to the customer eyeglass frames in accord with the frame selection data, wherein the frame selection data specifies structural material and style characteristics of eyeglass frames.

18. A system enabling a customer to electronically try on fitted eyeglass frames from a convenient location instead of having to shop in person, the system comprising:
at least one customer diagnostic location for determining size and image information about the customer using a digital camera for providing photographs of the customer and a means for scaling distances in the photographs to actual distances, for providing the customer with a password as a means of identifying the customer, and for providing the customer's size and image information along with the password, wherein the image information includes a characterization of the customer's face as a basic shape selected from a predetermined group of basic shapes; and
a remote electronic store responsive to the customer size and image information, for providing the customer with fitted images showing how the customer would appear wearing different eyeglass frames fitted to the customer based on the customer size and image information, the fitted images provided through a personal computer operated by the customer from a convenient location and connected to the remote electronic store using the password;
whereby the customer is able to view the fitted images provided by the remote electronic store to examine how the customer would appear wearing different eyeglass frames.

19. A method for enabling a customer who has first provided size and image information about the customer's head and face, to then use a personal computer to shop for fitted eyeglass frames from a convenient location instead of having to shop in person, the customer connecting the personal computer to the system using a password for identifying the customer to the system, the method comprising the steps of:
determining at a first location the size and image information and providing the customer's size and image information along with the password to a second location, wherein the image information includes a characterization of the customer's face as a basic shape selected from a predetermined group of basic shapes; and
using at the second location the size and image information to determine fitted images showing how the customer would appear wearing different eyeglass frames fitted to the customer, and providing the fitted images to the customer through the personal computer operated by the customer;
whereby the customer is able to view the fitted images provided by the remote electronic store to examine how the customer would appear wearing different eyeglass frames.

20. A method for shopping for fitted eyeglass frames as claimed in claim 19, further comprising the step of using the customer's size and image information in determining which eyeglass frames to suggest to the customer.

21. A method for shopping for fitted eyeglass frames as claimed in claim 19, further comprising the step of determining at the first location how the size and image data relates to an absolute scale of distance.

22. A method for shopping for fitted eyeglass frames as claimed in claim 19, further comprising the step of determining at the second location how the size and image data relates to an absolute scale of distance.

23. A method for shopping for fitted eyeglass frames as claimed in claim 19, wherein the second location downloads to the personal computer operated by the customer instructions for creating fitted images, showing how the customer would appear wearing different eyeglass frames, using the customer's size and image data along with different frame data.

24. A method for shopping for fitted eyeglass frames as claimed in claim 19, further comprising the steps of acquiring information from the customer for use in determining what eyeglass frames to suggest to the customer, and for suggesting particular eyeglass frames to the customer using the information from the customer.

25. A method for shopping for fitted eyeglass frames as claimed in claim 24, wherein the information acquired from the customer for use in determining what eyeglass frames to suggest to the customer includes structural material and style characteristics of eyeglass frames.

* * * * *

UNITED STATES PATENT AND TRADEMARK OFFICE
CERTIFICATE OF CORRECTION

PATENT NO : 5,983,201
DATED : November 9, 1999
INVENTOR(S) : Pierre N. Fay

It is certified that error appears in the above-identified patent and that said Letters Patent is hereby corrected as shown below:

At column 11, line 60, "shaves" should read --shapes--.

Signed and Sealed this

Twenty-third Day of May, 2000

Attest:

Q. TODD DICKINSON

Attesting Officer

Director of Patents and Trademarks